Feb. 14, 1961
G. W. KURTZ
2,971,851
SCAVENGER PACKET
Filed Nov. 25, 1958
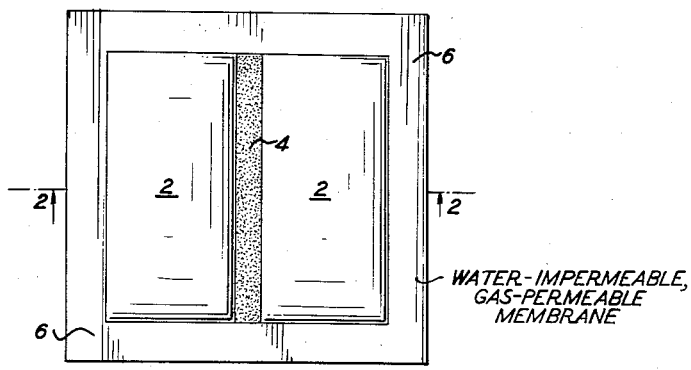
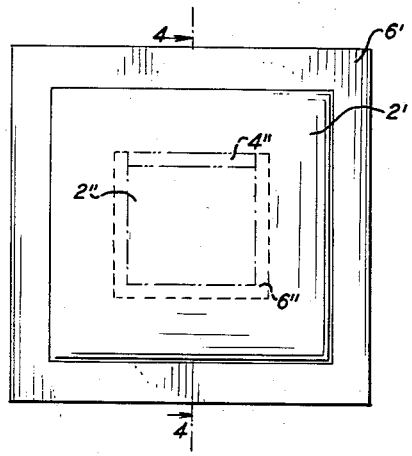
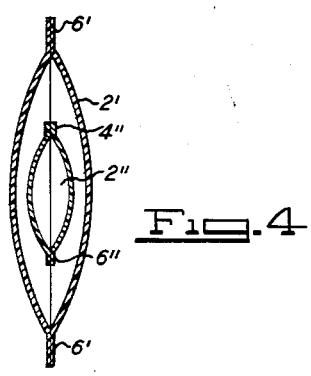
INVENTOR.
GEORGE W. KURTZ
BY
ATTORNEY

United States Patent Office 2,971,851
Patented Feb. 14, 1961

2,971,851
SCAVENGER PACKET

George W. Kurtz, Villa Park, Ill., assignor to Miles Laboratories, Inc., Elkhart, Ind., a corporation of Indiana Filed Nov. 25, 1958, Ser. No. 776,389

6 Claims. (Cl. 99—171)

This invention relates to a deoxygenating process and to a product useful therein. Particularly, the invention relates to a deoxygenating body and the method of its use. More particularly, the invention relates to a deoxygenating body, or scavenger packet, which comprises an enzyme system having glucose oxidase activity, a substrate for said enzyme system and a liquid, the components of said body being confined in a water-impermeable, gas-permeable membrane in such fashion that one of the components is separated from the other components by a rupturable seal.

Those familiar with the art of enzyme chemistry are aware of enzymatic processes for the removal of oxygen or glucose from food or other products through the use of an enzyme system having glucose oxidase activity. The reaction upon which these processes are based proceeds in accordance with the following schematic diagram:

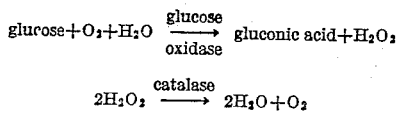

$$\text{glucose} + O_2 + H_2O \xrightarrow{\text{glucose oxidase}} \text{gluconic acid} + H_2O_2$$

$$2H_2O_2 \xrightarrow{\text{catalase}} 2H_2O + O_2$$

One such process is described and claimed in U.S. Reissue Patent No. 23,523, issued to Dwight L. Baker, July 22, 1952. The principle of basic patent is referred to in U.S. Patent No. 2,758,932, issued August 14, 1956, to Don Scott.

The Scott patent teaches a method of deoxygenating a hermetically sealed container by means of a deoxygenating body comprising a dispersion of water, glucose, and an enzyme system having glucose oxidase activity. In this patent the components of the deoxygenating body are separated from the contents of the container by an oxygen permeable, moisture-proof barrier such as cellophane, wax paper, and the like.

The instant invention is closely related to the packet of the Scott patent, but, as will be pointed out below, represents an improvement thereon.

It has been found that even under the most carefully controlled conditions a deoxygenating body prepared in accordance with the teachings of the Scot patent, that is, when the components of the deoxygenating body are in contact with each other within the membrane envelope, becomes substantially inactive and loses it ability to take up oxygen after the lapse of short periods of time if exposed to the atmosphere. Preparation of these prior art packets in the absence of atmospheric oxygen, and maintaining them under a nitrogen blanket until use has proven impractical. Attempts have been made to package the dry components and inject the requisite liquid immediately prior to use by some means such as a hypodermic needle, but this expedient also proved to be unsatisfactory on a commercial scale.

It has now been found, however, and forms the object of this invention, that the above disadvantages may be overcome if a deoxygenating body comprising a liquid, an enzyme system having glucose oxidase activity, and a substrate for said enzyme is enclosed in a packet of two compartments separated by a rupturable seal, one compartment containing one of the three components of the body and the other compartment containing the other two. In such a device no reaction can take place since all of the components must be in intimate contact before the enzyme will oxidize the substrate. The two compartments are separated by a rupturable seal which breaks under pressure allowing the three components to mix and thus activating the deoxygenating body. Such rupture is accomplished immediately prior to use of the packet and thus the packet has all its activity preserved to the time of use.

Fig. 1 represents a schematic drawing of one embodiment of the scavenger packet of this invention. Fig. 2 represents an end view of the packet of Fig. 1. Fig. 3 represents a second embodiment of the inventive concept, and Fig. 4 represents an end view of the packet of Fig. 3.

Turning now to the drawing, the packet or envelope of the figures are constructed of a gas-permeable, water-impermeable membrane such as polyethylene, laminated polyethylene, cast teflon, pliofilm, styrene, cellophane, and the like. The material must be gas-permeable to permit the passage of oxygen or oxygen containing gas such as air, and water-impermeable to prevent the passage of liquid. It will be understood that in certain embodiments of the invention, such as that shown in Fig. 3, that one compartment of the packet may be composed of a gas and liquid impermeable film. It is essential, however, that a gas-permeable liquid-impermeable film separate the total mixture from the surrounding area in order that oxygen containing gas may pass through the film and react in accordance with the equation set out above.

The packet of Figures 1 and 2 is constructed so that there is present two compartments 2 separated by a rupturable seal 4. The other edges of the compartments 6 are heat-sealed by methods known to the art.

As was stated above, the deoxygenating body enclosed within the packet comprises an enzyme having glucose oxidase activity, a substrate for that enzyme and a liquid. In the packet of Figures 1 and 2, two of these three components are confined within one of the compartments 2 and the other component is confined in the other compartment. For example, the enzyme may be confined in one compartment and the substrate and the liquid in the other; the enzyme and the liquid may be mixed and placed in one compartment and the substrate in the other; or the enzyme and substrate confined in one compartment and the liquid in the other. It is essential that the components of the deoxygenating body be kept separated prior to use to prevent deactivation of the deoxygenating body. The packet is activated immediately prior to use by breaking the rupturable seal 4 by passing the packet through low clearance rollers, or other obvious means, thus allowing the three components to become admixed. Oxygen or an oxygen-containing gas passes through the membrane and is utilized in the reaction, thus completely deoxygenating the air-space around the packet.

For use in vacuum packaging, it may be desirable that a pinhole be placed in each compartment of the packet to permit rapid passage of air and the concomitant equalization of pressure at the time of vacuum application. This prevents rupture of the packet due to the sudden pressure differential caused by the vacuum application during vacuum packing.

The utility of the packet of the invention is obvious; one or more, as desired, may be activated and placed in a container of material subject to oxidative deterioration and the container hermetically sealed. The oxygen in the container is consumed by the system and the contents of the container remain free of oxidative deterioration as long as the seal remains unbroken.

As has been previously stated, the components of the deoxygenating body comprise a liquid, an enzyme system having glucose oxidase activity, and a substrate for said enzyme system. The liquid component is preferably water, although other liquids which do not impair the activity of the enzyme system may be used. Other substances may be included, such as enzyme activators, humectants, extenders, and the like. Such substances include aqueous acetate or citrate buffer, aqueous sodium gluconate, aqueous glycerine, dilute ethanol and the like.

Enzyme systems having glucose oxidase activity have as their primary and principal constituent the enzyme glucose oxidase. One such enzyme system which also contains catalase and which is commercially available contains 1500 glucose oxidase units per gram, a unit being defined as that amount which will take up 10 cubic millimeters of oxygen per minute under the following conditions: 3.3% cerelose, 0.4% sodium salt of dehydroacetic acid, M/10 phosphate buffer pH 5.1 and temperature 30° C. This enzyme system also contains up to about 1100 units of catalase per gram, a unit being defined as that amount of catalase which will decompose 300 mg. of $H_2O_2$ under standard conditions. As is well known, the catalase breaks down hydrogen peroxide to water and molecular oxygen.

The substrate for the enzyme system will, of course, contain glucose. Preferably the substrate contains a major amount of glucose such as is present in cerelose, dextrose, corn syrup, etc.

Since the enzyme system operates most efficiently at a pH of between 4.5 and 8.0, and since gluconic acid is one product of the reaction, it is preferred to have present a buffering agent in an amount sufficient to maintain the pH of the activated packet within the optimum pH range. Suitable buffers include alkali metal phosphates, calcium carbonate, sodium acetate, sodium citrates and the like.

It is preferred that the substrate for the enzyme system be thoroughly admixed with a filler material to increase surface area to speed the oxygenation reaction and to assist in preventing the liquid from diffusing through the liquid impermeable film. The filler, preferably selected from the group of ground balsa wood pulp, cereal products, fine sawdust, carboxymethyl cellulose, agar, gelatin, gum, silica gel, diatomaceous earth, etc., prevents the liquid from gasifying and escaping through the gas-permeable membrane.

It is desired that there be present in the formulation a stabilizer material in order to insure against loss of enzyme potency. This stabilizer material may comprise silica gel, glycerine or similar materials. It will normally be present in amounts varying between about 0.10 to 0.33 g. per ml. of solution, preferably from about 0.15 to about 0.25 gm./ml.

It has been found advantageous to include in the formulation a preservative material in order to assist the stabilizer in insuring against loss of enzyme potency. This preservative may be selected from sodium gluconate solution, a solution of other salts of food acid and the like. Although it has been found that from 0.10 to 0.50 ml. of a sodium gluconate having a molarity between 0.38 and 1.5 is operable, it is preferred to use from 0.25 to 0.35 ml. of a sodium gluconate solution having molarity of 0.75 per packet.

It will be understood, of course, that different amounts of the components of the deoxygenating body will be used depending upon the amount of oxygen to be consumed. Ranges of operable and preferred proportions are set out in tabular form below:

*Range of components*

| | Operable | Preferred |
|---|---|---|
| Enzyme system (units) | 100–550 | 200–400 |
| Substrate: | | |
| Glucose (gms.) | 0.30–2.00 | 0.75–1.50 |
| Stabilizer (mg./ml.) | 0.10–0.33 | 0.15–0.25 |
| Preservative (g.) | 0.10–0.50 | 0.25–0.35 |
| Filler (gm.) | 0.10–1.00 | 0.30–0.60 |
| Buffer (gm.) | 0.01–0.30 | 0.018–0.200 |
| Water (ml.) | 1.00–3.00 | 1.80–2.20 |

The invention described in general terms above will be more specifically explained by reference to the following illustrative examples:

EXAMPLE I

Scavenger packets in accordance with the inventive concept were prepared using the following formulation as the dry component:

| | |
|---|---|
| Glucose oxidase | 2.0 lbs. |
| Cerelose | 40.0 lbs. |
| Filter aid (diatomaceous earth) | 7 lbs. 9 ozs. |
| Calcium carbonate | 1.0 lbs. |
| Sodium acetate | 1 lb. 14 ozs. |
| Citric acid | 2 lbs. 8 ozs. |

1.25 g. of the above mix was placed in one compartment of a 1 mil polyethylene packet and 2.0 ml. of water was placed in the other. Immediately prior to testing the rupturable seal of the packets was broken allowing the component to mix together. The packets were stored at varying temperatures and the oxygen uptake at the end of 48 and 108 hours was measured. The data obtained are set out in Table I below.

TABLE I

*Effect of temperature on oxygen pickup*

| °C. | Mm.³ O₂ consumed | |
|---|---|---|
| | 48 hours | 108 hours |
| 4.5 | 5,060 | 6,840 |
| 30.0 | 9,120 | 18,240 |
| 40.0 | 11,400 | 14,820 |

EXAMPLE II

Using the scavenger packets prepared as described in the example above, the relationship between the amount of moisture absorbed by the packet and oxygen uptake were measured. These data appear in Table II below.

TABLE II

*Effect of moisture on oxygen pickup*

| Percent H₂O absorbed | Mm.³ O₂/24 hours |
|---|---|
| 0.0 | 14,820 |
| 1.92 | 11,970 |
| 2.07 | 12,640 |
| 2.63 | 13,100 |
| 4.30 | 11,400 |
| 4.57 | 10,280 |
| 4.60 | 10,280 |
| 13.00 | 6,840 |
| 13.15 | 6,270 |

EXAMPLE III

Since it was apparent from the data in Example II above that moisture content of the packet had a deleterious effect upon the rate of oxygen uptake, the packets of the following formulation were prepared:

| | Grams |
|---|---|
| Glucose oxidase | 8.0 |
| Cerelose | 145.8 |
| Silica gel | 10.0 |
| Calcium carbonate | 4.0 |
| Sodium acetate | 6.9 |
| Citric acid | 9.3 |
| Sodium gluconate | 16.0 |
| Balsa wood | Variable |

These dry components were thoroughly admixed. 1.5 g. of the mix was placed in one compartment of a 1 mil polyethylene packet, 2.0 ml. of water was placed in the other compartment and the packet sealed. Immediately prior to testing, the rupturable seal was broken allowing the packet to become activated. The effect of the varying amounts of balsa wood on the rate of oxygen pickup at 24 hours and 120 hours are set out in Table III below.

TABLE III

| Gm. Balsa Wood | Mm.$^3$ O$_2$ pickup | |
|---|---|---|
| | 24 | 120 |
| 0 | 14,250 | 82,080 |
| 0.25 | 37,100 | 47,300 |
| 0.5 | 11,400 | 27,900 |

EXAMPLE IV

Glucose oxidase was dissolved in a sodium gulconate solution of varying molarity and diluted with 30% glycerine to a potency of 150 glucose oxidase units per ml. Two (2) ml. of this liquid was placed in one compartment of a 1 mil polyethylene packet and in the other compartment was placed 1.5 g. of the following formulations:

| | Grams |
|---|---|
| Cerelose | 145.8 |
| Silica gel | 10.0 |
| Calcium carbonate | 4.0 |
| Sodium acetate | 6.9 |
| Citric acid | 9.3 |
| Balsa wood | .5 |
| Sodium gluconate | Variable |

The effect of varying the amount of the sodium gluconate in the formulation on oxygen pickup is set out in Table IV below.

TABLE IV

| Molarity Na gluconate | Mm.$^3$ O$_2$ consumed 24 hours |
|---|---|
| 1.5 | 19,100 |
| 0.75 | 24,500 |
| 0.38 | 17,700 |

EXAMPLE V

The liquid component of the packet of Example IV containing varying amounts of sodium gluconate was tested for stability over a 30 day period. Results of this stability test in glucose oxidase units per ml. are set out in Table V below.

TABLE V

| Molarity Na gluconate | Potency (u./ml.) | |
|---|---|---|
| | Original | After 1 mo. |
| 1.5 | 165 | 167 |
| 0.75 | 180 | 181 |
| 0.38 | 160 | 161 |

EXAMPLE VI

The scavenger packets of Example IV were activated and immediately sealed in No. 2 cans and the oxygen uptake at the end of 24 hours was measured. The data obtained are set out in Table VI below.

TABLE VI

| Molarity sodium gluconate | Mm.$^3$ O$_2$ consumed |
|---|---|
| 1.5 | 9,120 |
| .75 | 11,970 |
| .38 | 8,550 |

EXAMPLE VII

In one compartment of a 1 mil polyethylene packet prepared in accordance with the concept of this invention there was placed 1.3 g. of cerelose and 0.2 g. of citric acid. In a similar packet there was placed 1.3 g. of cerelose, 0.2 g. of citric acid and 0.5 g. of ground balsa wood. In the other compartment of each packet there was placed 2 ml. of a glucose oxidase solution prepared as described in connection with Example IV above. The packets were sealed, the rupturable seal broken immediately prior to testing and the packets placed in No. 2 cans which were hermetically sealed. At the end of 24 hours the packet without the balsa wood consumed 10,810 mm.$^3$ O$_2$ whereas the packet containing the balsa wood consumed 26,200 mm.$^3$ O$_2$.

EXAMPLE VIII

In this experiment glucose oxidase solution prepared as described in Example IV was used as the liquid component. Two (2) ml. of this liquid solution was placed in one compartment of a 1 mil polyethylene packet; in the other compartment there was placed 1.25 gm. of cerelose and a variable amount of citric acid. The rupturable seal was broken immediately prior to sealing in No. 2 cans and the oxygen uptake measured after 24 hours. The data obtained is set out in Table VII below.

TABLE VII

| Citric Acid (mgm.) | Mm.$^3$ O$_2$ consumed |
|---|---|
| 8.0 | 8,550 |
| 20.0 | 8,550 |
| 60.0 | 10,250 |
| 180.0 | 11,960 |

EXAMPLE IX

In one compartment of a 1 mil polyethylene packet there was placed 1.8 g. of a dry mix having the following formula:

| | Parts |
|---|---|
| Cerelose | 130 |
| Citric acid | 2 |
| Balsa wood | 50 |

In the other compartment there was placed 2.0 ml. of a liquid glucose oxidase composition prepared as described in Example IV above. The packets were sealed and the rupturable seal broken immediately before placing in No. 2 cans filled with a standard volume of a white cake mix. Similar packets were placed in a No. 2 can containing walnut meats. After the expiration of one week the percentage of oxygen remaining in the head space was measured.

In the case of white cake mix, those cans containing scavenger packets were found to contain 9.5% oxygen. Control cans without scavenger packets contained 20.3% oxygen. In the case of the walnut meats those cans containing the scavenger packets contained 10.5% oxygen; those control cans without scavenger packets were found to contain 21.0% oxygen.

EXAMPLE X

In one compartment of a polyethylene packet prepared from polyethylene having a thickness of 0.75 mil, there was placed 1.8 g. of a dry mix having the following formula:

| | Parts |
|---|---|
| Cerelose | 130 |
| Citric acid | 2 |
| Balsa wood | 50 |

In the other compartment there was placed 2.0 ml. of a liquid glucose oxidase composition prepared as described in Example IV above.

The packets were weighed and held at room temperature and room humidity for 72 hours. At the end of that period they were reweighed and the moisture loss of the liquid component calculated. It was found that at the end of 72 hours the moisture loss amounted to 19.7 mg. (0.07%).

At the end of 5½ hours the oxygen uptake was measured to be 12,500 cu. mm. At the end of 72 hours the oxygen uptake was 19,500 cu. mm.

EXAMPLE XI

Using a polyethylene having a thickness of 0.50 mil, packets were prepared as described in connection with Example X above. These packets were placed in a desiccator over calcium chloride for one week and lost 2.57% of the moisture of the liquid component during that time.

Packets prepared from this polyethylene were measured for oxygen uptake at the end of 23 hours. The oxygen uptake was found to be 56,400 cu. mm.

EXAMPLE XII

Using the components as described in connection with the packets of Example X above, but using cast Teflon films of various thicknesses, packets were prepared and the oxygen uptake measured at the end of 24 hours. The data obtained are set out in Table IX below:

TABLE IX

| Teflon, mil. | Mm.³ O₂ consumed (24 hrs.) |
|---|---|
| 0.25 | 34,200 |
| 0.38 | 11,900 |
| 0.50 | 15,400 |

To reiterate briefly, the instant invention comprises a deoxygenating body which comprises the components of an enzyme system having glucose oxidase activity, a substrate for the enzyme system, and a liquid, said components being enclosed in a liquid-impermeable gas-permeable membrane and one of said components being separated from the other two by a rupturable seal. The substrate for the enzyme system preferably contains a filler material, a buffering agent, a preservative, and a stabilizer. Operable and preferred ranges of components are as follows:

Range of components

| | Operable | Preferred |
|---|---|---|
| Enzyme system (units) | 100–550 | 200–400 |
| Substrate: | | |
| Glucose (gms.) | 0.30–2.00 | 0.75–1.50 |
| Stabilizer (gm./ml.) | 0.10–0.33 | 0.15–0.25 |
| Preservative (g.) | 0.10–0.50 | 0.25–0.35 |
| Filler (gm.) | 0.10–1.00 | 0.30–0.60 |
| Buffer (gm.) | 0.01–0.30 | 0.018–0.200 |
| Water (ml.) | 1.00–3.00 | 1.80–2.20 |

Particularly preferred and contemplated in the preferred embodiment of this invention is a composition of the following formulation:

| | | |
|---|---|---|
| Membrane | mil polyethylene | 0.50 |
| Glucose oxidase | units | 300 |
| Water | ml. | 1.4 |
| Cerelose | gm. | 1.3 |
| Citric acid | gm. | .02 |
| Glycerine | ml. | .60 |
| Sodium gluconate | gm. | 0.38 |
| Balsa wood (6–9 lb./cu. ft.—coarse ground) | gm. | 0.50 |

In this preferred embodiment of this invention a solution of the sodium gluconate in the water is mixed with the glycerine and sufficient glucose oxidase to give a potency of 300 units (150 u./ml.). This liquid is placed in one compartment of the polyethylene packet and 1.80 g. of a mix of the cerelose, balsa wood and citric acid is placed in the other compartment.

What is claimed is:

1. A deoxygenating body comprising an enzyme system having glucose oxidase activity and a substrate in liquid form for said enzyme system, said deoxygenating body being enclosed in a water-impermeable, gas-permeable membrane, said enzyme system being separated from said substrate by separating means which include a seal rupturable upon application of pressure to said membrane.

2. A deoxygenating body in accordance with claim 1 wherein said substrate is a source of glucose.

3. A deoxygenating body in accordance with claim 1 wherein said substrate is cerelose, and contains combined therewith, a filler and a buffering agent.

4. An article of manufacture comprising a packet of a water-impermeable, gas-permeable membrane, said packet containing two compartments separated by a seal rupturable upon application of pressure to said packet, one of said compartments containing an enzyme system having glucose oxidase activity in dry solid form and the other of said compartments containing a substrate for said glucose oxidase in liquid form.

5. An article according to claim 4 wherein said substrate comprises glucose, and contains in admixture therewith citric acid and sodium gluconate.

6. An article according to claim 4 wherein said substrate comprises cerelose, and contains in admixture therewith citric acid and ground balsa wood.

References Cited in the file of this patent

UNITED STATES PATENTS

| Re. 23,523 | Baker | July 22, 1952 |
| 2,245,738 | Taylor | June 17, 1941 |
| 2,758,932 | Scott | Aug. 14, 1956 |
| 2,758,934 | Scott | Aug. 14, 1956 |
| 2,765,233 | Sarrett et al. | Oct. 2, 1956 |
| 2,825,651 | Loo et al. | Mar. 4, 1958 |